US012579822B2

(12) United States Patent
Sharma et al.

(10) Patent No.: US 12,579,822 B2
(45) Date of Patent: Mar. 17, 2026

(54) VEHICLE DISPLAY SYSTEM FOR NIGHTTIME DRIVING

(71) Applicant: GM Global Technology Operations LLC, Detroit, MI (US)

(72) Inventors: Manoj Sharma, Troy, MI (US); Joseph F. Szczerba, Grand Blanc, MI (US); Akilesh Rajavenkatanarayanan, Macomb, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 371 days.

(21) Appl. No.: 18/329,997

(22) Filed: Jun. 6, 2023

(65) Prior Publication Data

US 2024/0412530 A1 Dec. 12, 2024

(51) Int. Cl.
| | |
|---|---|
| *G06V 20/58* | (2022.01) |
| *B60R 1/23* | (2022.01) |
| *G02B 27/01* | (2006.01) |
| *G06N 3/0464* | (2023.01) |
| *G06N 3/084* | (2023.01) |

(Continued)

(52) U.S. Cl.
CPC ............... *G06V 20/58* (2022.01); *B60R 1/23* (2022.01); *G02B 27/0101* (2013.01); *G02B 27/0179* (2013.01); *G06N 3/0464* (2023.01); *G06N 3/084* (2013.01); *G06T 5/70* (2024.01); *G06T 7/10* (2017.01); *G06T 7/70* (2017.01); *G06T 11/00* (2013.01); *G06V 10/774* (2022.01); *B60R 2300/303* (2013.01); *B60R 2300/307* (2013.01); *G02B 5/205* (2013.01); *G02B 13/0095* (2013.01); *G02B 2027/0118*

(2013.01); *G02B 2027/0138* (2013.01); *G02B 2027/0141* (2013.01); *G02B 2027/0181* (2013.01); *G02B 27/144* (2013.01); *G06T 2207/10144* (2013.01); *G06T 2207/20021* (2013.01); *G06T 2207/20081* (2013.01); *G06T 2207/30252* (2013.01); *G06T 2207/30268* (2013.01)

(58) Field of Classification Search
None
See application file for complete search history.

(56) References Cited

U.S. PATENT DOCUMENTS

| | | | | |
|---|---|---|---|---|
| 11,983,853 B1 * | 5/2024 | Zhu | ........................... | G06T 5/70 |
| 2022/0020131 A1 * | 1/2022 | Metzler | ..................... | G06T 5/80 |

(Continued)

OTHER PUBLICATIONS

Chen, et al. "Learning to See in the Dark." IEEE/CVF Conference on Computer Vision and Pattern Recognition, 2018, pp. 3291-3300.

(Continued)

*Primary Examiner* — Leon Viet Q Nguyen
(74) *Attorney, Agent, or Firm* — Vivacqua Crane, PLLC

(57) ABSTRACT

A method for providing information to an occupant of a vehicle includes training a machine learning algorithm to receive a nighttime image as an input and produce an enhanced image as an output. The method also includes capturing the nighttime image of an environment surrounding the vehicle using a camera of the vehicle. The method also includes enhancing the nighttime image using the machine learning algorithm to produce the enhanced image. The method also includes identifying an object of interest in the enhanced image using a computer vision algorithm. The method also includes notifying the occupant of the vehicle about the object of interest.

15 Claims, 9 Drawing Sheets

(51) Int. Cl.

| | |
|---|---|
| *G06T 5/70* | (2024.01) |
| *G06T 7/10* | (2017.01) |
| *G06T 7/70* | (2017.01) |
| *G06T 11/00* | (2006.01) |
| *G06V 10/774* | (2022.01) |
| *G02B 5/20* | (2006.01) |
| *G02B 13/00* | (2006.01) |
| *G02B 27/14* | (2006.01) |

(56) References Cited

U.S. PATENT DOCUMENTS

| | | | |
|---|---|---|---|
| 2022/0103789 A1* | 3/2022 | Jung ...................... | H04N 5/265 |
| 2022/0292306 A1* | 9/2022 | Radhakrishnan ...... | G06V 10/82 |
| 2024/0249178 A1* | 7/2024 | Sawada ................. | G06N 20/00 |

OTHER PUBLICATIONS

Jiang, et al. "Learning to See Moving Objects in the Dark," IEEE/CVF International Conference on Computer Vision, 2019, pp. 7324-7332.
United States Patent and Trademark Office. U.S. Appl. No. 17/862,859, filed Jul. 12, 2022.

\* cited by examiner

100

104a

104

VEHICLE DISPLAY SYSTEM FOR NIGHTTIME DRIVING

INTRODUCTION

The present disclosure relates to systems and methods for providing information to an occupant of a vehicle.

To increase occupant awareness and convenience, vehicles may be equipped with camera systems which are configured to detect and identify objects in an environment surrounding the vehicle. After identifying objects, vehicles may use display systems to increase occupant awareness by notifying occupants of objects in the environment surrounding the vehicle. However, current systems may not be suitable for low-light conditions, such as, for example, nighttime driving scenarios. Night-vision camera systems, such as, for example, infrared and/or thermal camera systems may be utilized to provide additional perception capability in low-light conditions. However, use of night-vision camera systems may increase weight, resource use, and/or system complexity. Additionally, night-vision camera systems may provide low-resolution images, resulting in reduced object detection and identification performance.

Thus, while current camera and display systems and methods achieve their intended purpose, there is a need for a new and improved system and method for providing information to an occupant of a vehicle.

SUMMARY

According to several aspects, a method for providing information to an occupant of a vehicle is provided. The method includes training a machine learning algorithm to receive a nighttime image as an input and produce an enhanced image as an output. The method also includes capturing the nighttime image of an environment surrounding the vehicle using a camera of the vehicle. The method also includes enhancing the nighttime image using the machine learning algorithm to produce the enhanced image. The method also includes identifying an object of interest in the enhanced image using a computer vision algorithm. The method also includes notifying the occupant of the vehicle about the object of interest.

In another aspect of the present disclosure, training the machine learning algorithm further may include generating a training dataset. The training dataset includes a plurality of image pairs. Each of the plurality of image pairs includes a sample input image and a sample output image. Training the machine learning algorithm further may include training the machine learning algorithm using supervised learning with the training dataset.

In another aspect of the present disclosure, generating the training dataset further may include capturing the plurality of image pairs using the camera. For each of the plurality of image pairs, the sample input image is a normal exposure image of a nighttime environment surrounding the vehicle and the sample output image is a high exposure image of the nighttime environment surrounding the vehicle.

In another aspect of the present disclosure, generating the training dataset further may include capturing the plurality of image pairs using the camera. For each of the plurality of image pairs, the sample input image is a normal exposure image of a nighttime environment surrounding the vehicle and the sample output image is a computer restored image of the nighttime environment surrounding the vehicle.

In another aspect of the present disclosure, capturing one of the plurality of image pairs further may include capturing the sample input image using the camera. Capturing one of the plurality of image pairs further may include generating the sample output image by restoring the sample input image using at least one of a computer vision denoising algorithm and a computer vision dehazing algorithm.

In another aspect of the present disclosure, generating the training dataset further may include capturing the plurality of image pairs using the camera. For each of the plurality of image pairs, the sample input image is a simulated nighttime image of a daytime environment surrounding the vehicle and the sample output image is a normal exposure image of the daytime environment surrounding the vehicle.

In another aspect of the present disclosure, capturing one of the plurality of image pairs further may include capturing the sample output image using a first training camera. Capturing one of the plurality of image pairs further may include capturing the sample input image using a second training camera and a reverse apodizing neutral density filter configured to darken the sample output image.

In another aspect of the present disclosure, identifying the object of interest further may include segmenting the enhanced image into a plurality of image segments. Each of the plurality of image segments represents one of a plurality of objects in the enhanced image. Identifying the object of interest further may include identifying the object of interest, where object of interest is one of the plurality of objects in the enhanced image.

In another aspect of the present disclosure, notifying the occupant of the vehicle further may include displaying a notification to the occupant of the vehicle using a display.

In another aspect of the present disclosure, the display is at least one of an augmented reality head-up display (AR-HUD) system and a transparent windscreen display (TWD) system. Displaying the notification further may include determining a location of the object of interest relative to the vehicle. Displaying the notification further may include calculating a size, shape, and location of a graphic based on the location of the object of interest relative to the vehicle. Displaying the notification further may include displaying the graphic on a windscreen of the vehicle using at least one of the AR-HUD system and the TWD system based on the size, shape, and location.

According to several aspects, a system for providing information to an occupant of a vehicle is provided. The system includes a notification system including a camera, a display, and a vehicle controller in electrical communication with the camera and the display. The vehicle controller is programmed to capture a nighttime image of an environment surrounding the vehicle using the camera. The vehicle controller is further programmed to enhance the nighttime image using a machine learning algorithm to produce an enhanced image. The vehicle controller is further programmed to identify an object of interest in the enhanced image using a computer vision algorithm. The vehicle controller is further programmed to notify the occupant of the vehicle about the object of interest using the display.

In another aspect of the present disclosure, to identify the object of interest, the vehicle controller is further programmed to segment the enhanced image into a plurality of image segments. Each of the plurality of image segments represents one of a plurality of objects in the enhanced image. To identify the object of interest, the vehicle controller is further programmed to identify the object of interest, where the object of interest is one of the plurality of objects in the enhanced image.

In another aspect of the present disclosure, the display is an augmented reality head-up display (AR-HUD) system in electrical communication with the vehicle controller. The AR-HUD system includes an occupant position tracking device and an AR-HUD projector. To notify the occupant of the vehicle, the vehicle controller is further programmed to determine a location of the object of interest relative to the vehicle. To notify the occupant of the vehicle, the vehicle controller is further programmed to determine a position of the occupant of the vehicle using the occupant position tracking device. To notify the occupant of the vehicle, the vehicle controller is further programmed to calculate a size, shape, and location of a graphic based on the position of the occupant and the location of the object of interest relative to the vehicle. To notify the occupant of the vehicle, the vehicle controller is further programmed to display the graphic on a windscreen of the vehicle using the augmented reality head up display system based on the size, shape, and location.

In another aspect of the present disclosure, the display further includes a transparent windscreen display (TWD) system in electrical communication with the vehicle controller. The TWD system includes a TWD projector. To notify the occupant of the vehicle, the vehicle controller is further programmed to display the graphic on the windscreen of the vehicle using the TWD projector based on the size, shape, and location.

In another aspect of the present disclosure, the system further includes a training system including a training camera system. The training camera system includes a beam splitter having a first port, a second port, and a third port. The training camera system further includes a first training camera in optical communication with the first port of the beam splitter. The training camera system further includes a second training camera. The training camera system further includes a reverse apodizing neutral density filter in optical communication with the second training camera and the second port of the beam splitter. The training camera system further includes a relay lens in optical communication with the third port of the beam splitter. The training camera system further includes a training controller in electrical communication with the first training camera and the second training camera. The training controller is programmed to generate a training dataset using the training camera system. The training dataset includes a plurality of image pairs. Each of the plurality of image pairs includes a sample input image and a sample output image. The training controller is further programmed to train the machine learning algorithm using supervised learning with the training dataset.

In another aspect of the present disclosure, to generate the training dataset, the training controller is further programmed to capture the plurality of image pairs using the first training camera and the second training camera. For each of the plurality of image pairs, the sample input image is a simulated nighttime image of a daytime environment surrounding the vehicle and the sample output image is a normal exposure image of the daytime environment surrounding the vehicle.

In another aspect of the present disclosure, to capture one of the plurality of image pairs, the training controller is further programmed to capture the sample output image using the first training camera. To capture one of the plurality of image pairs, the training controller is further programmed to capture the sample input image using the second training camera.

According to several aspects, a system for providing information to an occupant of a vehicle is provided. The system includes a notification system including a camera, an augmented reality head-up display (AR-HUD) system including an occupant position tracking device and an AR-HUD projector, and a vehicle controller in electrical communication with the camera and the AR-HUD system. The vehicle controller is programmed to capture a nighttime image of an environment surrounding the vehicle using the camera. The vehicle controller is further programmed to enhance the nighttime image using a machine learning algorithm to produce an enhanced image. The vehicle controller is further programmed to identify an object of interest in the enhanced image using a computer vision algorithm. The vehicle controller is further programmed to notify the occupant of the vehicle about the object of interest using the AR-HUD system.

In another aspect of the present disclosure, to notify the occupant of the vehicle, the vehicle controller is further programmed to determine a location of the object of interest relative to the vehicle. To notify the occupant of the vehicle, the vehicle controller is further programmed to determine a position of the occupant of the vehicle using the occupant position tracking device. To notify the occupant of the vehicle, the vehicle controller is further programmed to calculate a size, shape, and location of a graphic based on the position of the occupant and the location of the object of interest relative to the vehicle. To notify the occupant of the vehicle, the vehicle controller is further programmed to display the graphic on a windscreen of the vehicle using the augmented reality head up display system based on the size, shape, and location.

In another aspect of the present disclosure, the system further includes a training system including a training camera system. The training camera system includes a beam splitter having a first port, a second port, and a third port. The training camera system further includes a first training camera in optical communication with the first port of the beam splitter. The training camera system further includes a second training camera. The training camera system further includes a reverse apodizing neutral density filter in optical communication with the second training camera and the second port of the beam splitter. The training camera system further includes a relay lens in optical communication with the third port of the beam splitter. The training camera system further includes a training controller in electrical communication with the first training camera and the second training camera. The training controller is programmed to generate a training dataset using the training camera system. The training dataset includes a plurality of image pairs. Each of the plurality of image pairs includes a sample input image and a sample output image. The training controller is further programmed to train the machine learning algorithm using supervised learning with the training dataset.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Driving in low-light conditions may result in increased risk of collision due to low-visibility. Color camera systems may be unable to capture detail and contrast in low-light conditions. Night-vision camera systems, including infrared and/or thermal camera systems may be used to receive additional detail and contrast in low-light conditions. However, use of night-vision camera systems results in additional weight, resource use, and/or system complexity. Therefore, the present disclosure provides a new and improved system for providing information to an occupant of a vehicle about objects of interest in low-light conditions utilizing color camera systems.

Figure 1:
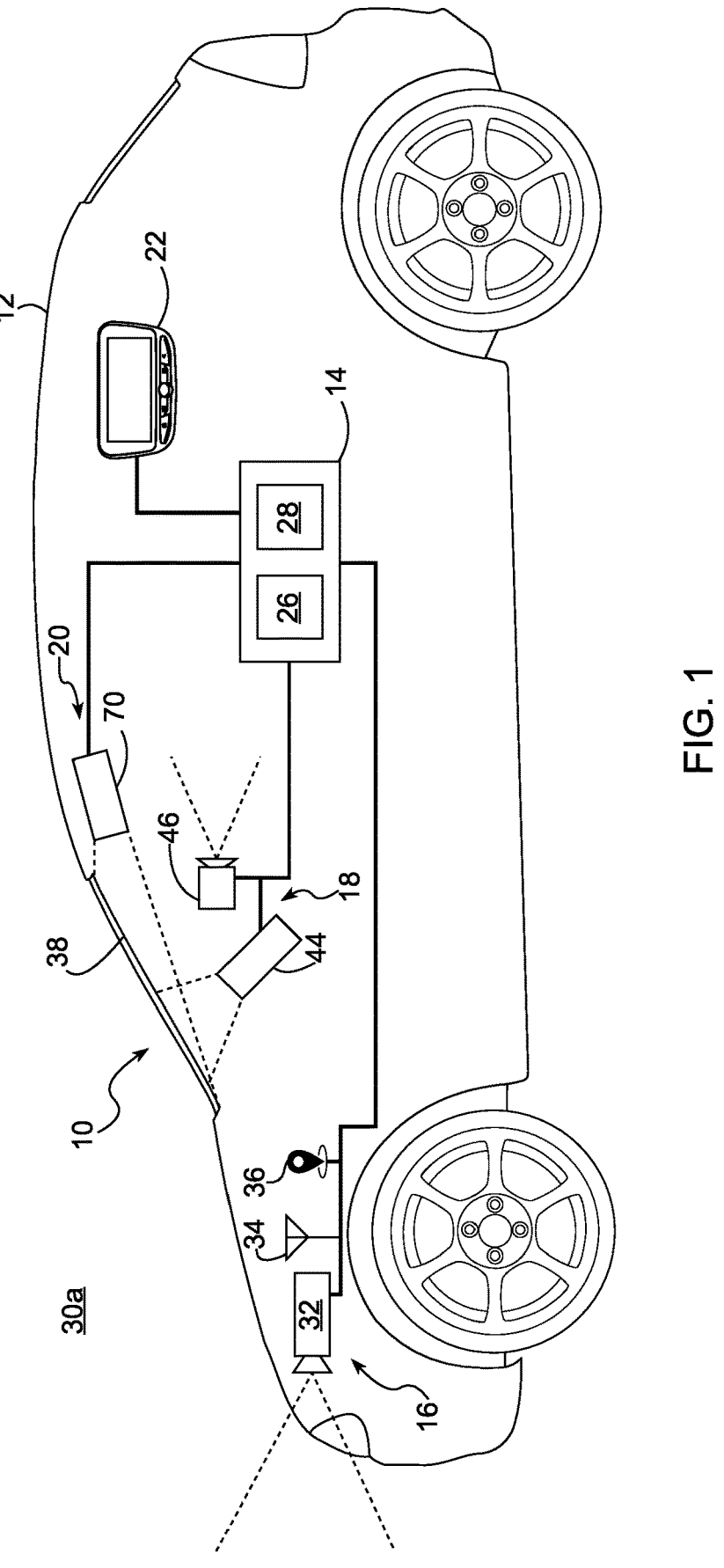
FIG. 1 is a schematic diagram of a system for providing information to an occupant of a vehicle, according to an exemplary embodiment.

Referring to FIG. 1, a system for providing information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a vehicle controller 14, a plurality of vehicle sensors 16, an augmented reality head-up display (AR-HUD) system 18, a transparent windscreen display (TWD) system 20, and a human-machine interface (HMI) 22.

The vehicle controller 14 is used to implement a method 100 for providing information to an occupant of a vehicle, as will be described below. The vehicle controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the vehicle controller 14, a semiconductor-based microprocessor (in the form of a microchip or chip set), a macroprocessor, a combination thereof, or generally a device for executing instructions. The computer readable storage device or media 28 may include volatile and nonvolatile storage in read-only memory (ROM), random-access memory (RAM), and keep-alive memory (KAM), for example. KAM is a persistent or non-volatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the vehicle controller 14 to control various systems of the vehicle 12. The vehicle controller 14 may also consist of multiple controllers which are in electrical communication with each other. The vehicle controller 14 may be inter-connected with additional systems and/or controllers of the vehicle 12, allowing the vehicle controller 14 to access data such as, for example, speed, acceleration, braking, and steering angle of the vehicle 12.

The vehicle controller 14 is in electrical communication with the plurality of vehicle sensors 16, the AR-HUD system 18, the TWD system 20, and the HMI 22. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the vehicle controller 14 are within the scope of the present disclosure.

The plurality of vehicle sensors 16 are used to acquire information about an environment 30a surrounding the vehicle 12. In an exemplary embodiment, the plurality of vehicle sensors 16 includes at least a camera system 32, a vehicle communication system 34, and a global navigation satellite system (GNSS) 36.

In another exemplary embodiment, the plurality of vehicle sensors 16 further includes sensors to determine performance data about the vehicle 12. In an exemplary embodiment, the plurality of vehicle sensors 16 further includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor.

In another exemplary embodiment, the plurality of vehicle sensors 16 further includes sensors to determine information about the environment within the vehicle 12, such as, for example, a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment surrounding the vehicle 12, for example, an ambient air temperature sensor, a barometric pressure sensor, and/or a photo and/or video camera which is positioned to view the environment in front of the vehicle 12.

In another exemplary embodiment, at least one of the plurality of vehicle sensors 16 is capable of measuring distances in the environment surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of vehicle sensors, such as, for example, LiDAR sensors, ultrasonic ranging sensors, radar sensors, and/or time-of-flight sensors are within the scope of the present disclosure. The plurality of vehicle sensors 16 are in electrical communication with the vehicle controller 14 as discussed above.

The camera system 32 is used to capture images and/or videos of the environment 30*a* surrounding the vehicle 12. In an exemplary embodiment, the camera system 32 includes a photo and/or video camera which is positioned to view the environment 30*a* surrounding the vehicle 12. In a non-limiting example, the camera system 32 includes a camera affixed inside of the vehicle 12, for example, in a headliner of the vehicle 12, having a view through a windscreen 38. In another non-limiting example, the camera system 32 includes a camera affixed outside of the vehicle 12, for example, on a roof of the vehicle 12, having a view of the environment 30*a* in front of the vehicle 12.

In another exemplary embodiment, the camera system 32 is a surround view camera system including a plurality of cameras (also known as satellite cameras) arranged to provide a view of the environment 30*a* adjacent to all sides of the vehicle 12. In a non-limiting example, the camera system 32 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 32 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 34 is used by the vehicle controller 14 to communicate with other systems external to the vehicle 12. For example, the vehicle communication system 34 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 34 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 34 may further include an embedded universal integrated circuit card (eUICC) configured to store at least one cellular connectivity configuration profile, for example, an embedded subscriber identity module (eSIM) profile. The vehicle communication system 34 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 34 may include one or more antennas and/or communication transceivers for receiving and/or transmitting signals, such as cooperative sensing messages (CSMs). The vehicle communication system 34 is configured to wirelessly communicate information between the vehicle 12 and another vehicle. Further, the vehicle communication system 34 is configured to wirelessly communicate information between the vehicle 12 and infrastructure or other vehicles. It should be understood that the vehicle communication system 34 may be integrated with the vehicle controller 14 (e.g., on a same circuit board with the vehicle controller 14 or otherwise a part of the vehicle controller 14) without departing from the scope of the present disclosure.

The GNSS 36 is used to determine a geographical location of the vehicle 12. In an exemplary embodiment, the GNSS 36 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 36 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 36. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 36 may be integrated with the vehicle controller 14 (e.g., on a same circuit board with the vehicle controller 14 or otherwise a part of the vehicle controller 14) without departing from the scope of the present disclosure.

Figure 2:
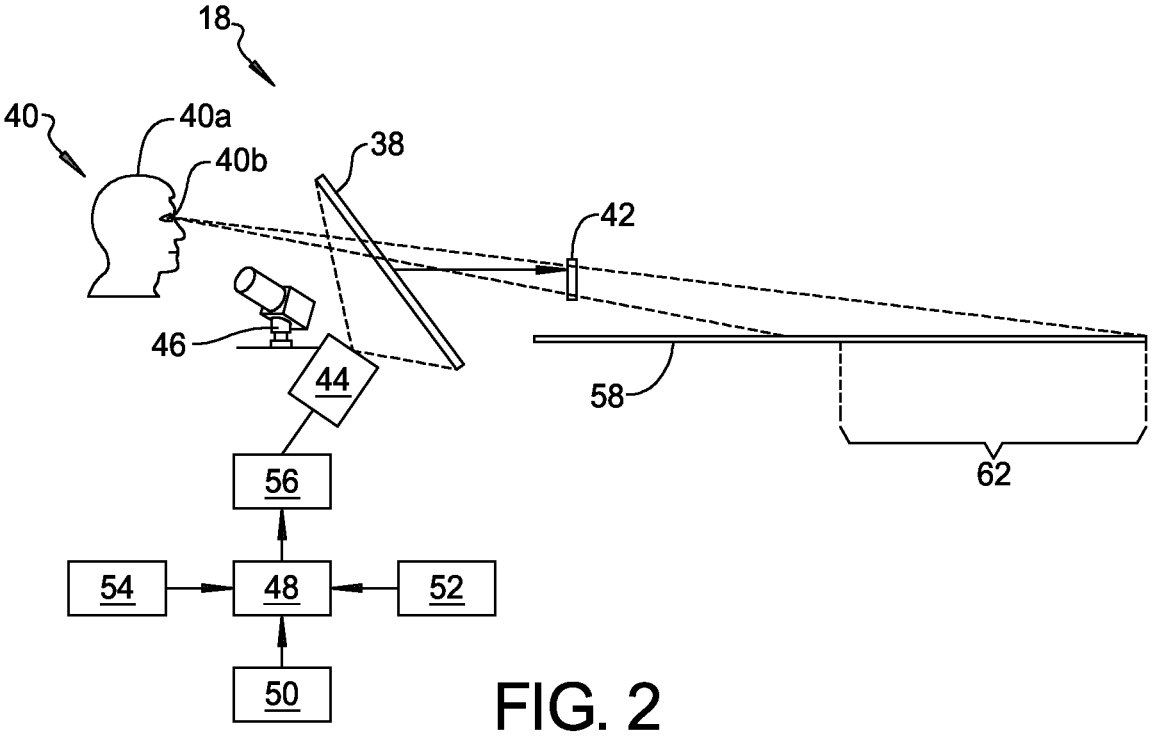
FIG. 2 is a schematic diagram of an AR-HUD system for use by an exemplary occupant, according to an exemplary embodiment.

Referring to FIG. 2, a system diagram of the AR-HUD system 18 for use by an exemplary occupant 40 is shown. In the scope of the present disclosure, the occupant 40 includes, in a non-limiting example, a driver, a passenger, and/or any additional persons in the vehicle 12. The AR-HUD system 18 is used to display AR-HUD graphics 42 (i.e., notification symbols providing visual information to the occupant 40) on the windscreen 38 of the vehicle 12. The AR-HUD system 18 includes an AR-HUD projector 44 and an occupant position tracking device 46. The AR-HUD system 18 is in electrical communication with the vehicle controller 14 as discussed above.

The AR-HUD projector 44 is used to project the AR-HUD graphics 42 on the windscreen 38 of the vehicle 12. It should be understood that various devices designed to project images including, for example, optical collimators, laser projectors, digital light projectors (DLP), and the like are within the scope of the present disclosure.

The occupant position tracking device 46 is used to determine a position of the occupant 40 in the vehicle 12. For example, the occupant position tracking device 46 may track a position of a head 40*a* or eyes 40*b* of the occupant 40. The position of the occupant 40 in the vehicle 12 from the occupant position tracking device 46 is used to locate the AR-HUD graphic 42 on the windscreen 38 of the vehicle 12. In an exemplary embodiment, the occupant position tracking device 46 is one or more cameras disposed in the vehicle 12.

To operate the AR-HUD system 18, the vehicle controller 14 includes multiple software modules, including a system manager 48. During operation of the system 10, the system manager 48 receives at least a first input 50, a second input 52, and a third input 54. The first input 50 is indicative of the location of the vehicle 12 in space (i.e., the geographical location of the vehicle 12), the second input 52 is indicative of the vehicle occupant 40 position in the vehicle 12 (e.g., the position of the eyes and/or head of the occupant 40 in the vehicle 12), and the third input 54 is data pertaining to an object of interest in the environment 30*a* surrounding the vehicle 12, as will be discussed in greater detail below. The first input 50 may include data such as GNSS data (e.g., GPS data), vehicle speed, roadway curvature, and vehicle steering, and this data is collected from the plurality of vehicle sensors 16. The second input 52 is received from the occupant position tracking device 46. The third input 54 is data pertaining to the object of interest in the environment 30*a* surrounding the vehicle 12. The system manager 48 is configured to determine (e.g., compute) the type, size, shape, and color of the AR-HUD graphics 42 to be displayed using the AR-HUD projector 44 based on the first input 50 (i.e., the vehicle location in the environment 30*a*), the second input 52 (e.g., the position of the eyes 40*b* and/or head 40*a* of the occupant 40 in the vehicle 12), and the third input 54 (i.e. the object of interest in the environment 30*a* surrounding the vehicle 12) The system manager 48 instructs an image engine 56, which is a software module or an integrated circuit of the AR-HUD projector 44 or the vehicle controller 14, to display the AR-HUD graphic 42 using the AR-HUD projector 44. The image engine 56 displays the AR-HUD graphic 42 on the windscreen 38 of the vehicle 12 using the AR-HUD projector 44 based on the type, size, shape, and color of the AR-HUD graphic 42 determined by the system manager 48. The AR-HUD graphic 42 is projected on the windscreen 38 by the AR-HUD projector 44 to show the AR-HUD graphic 42 along a roadway surface 58.

Figure 3:
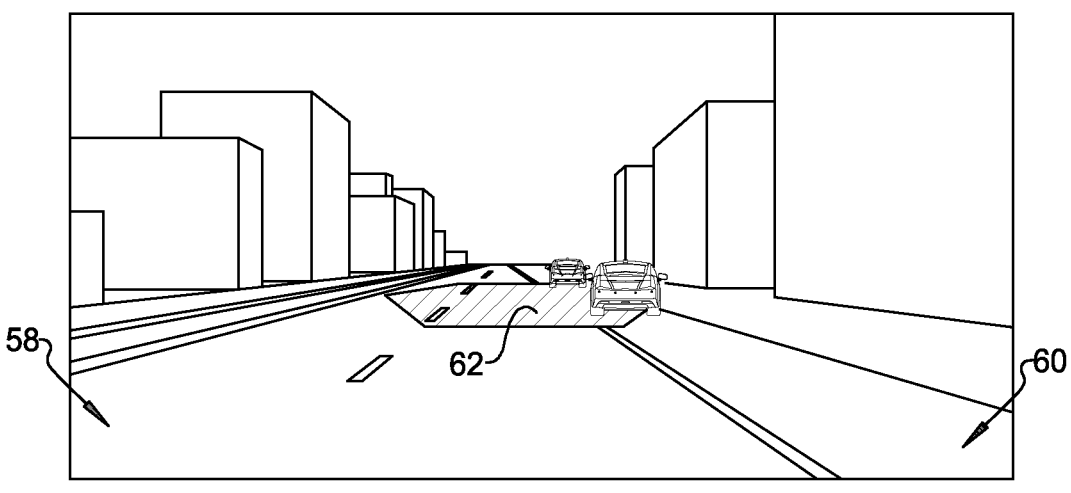
FIG. 3 is a schematic front view of a dual-focal plane augmented reality display, highlighting a second image plane of the dual-focal plane augmented reality display, according to an exemplary embodiment.
Figure 4:
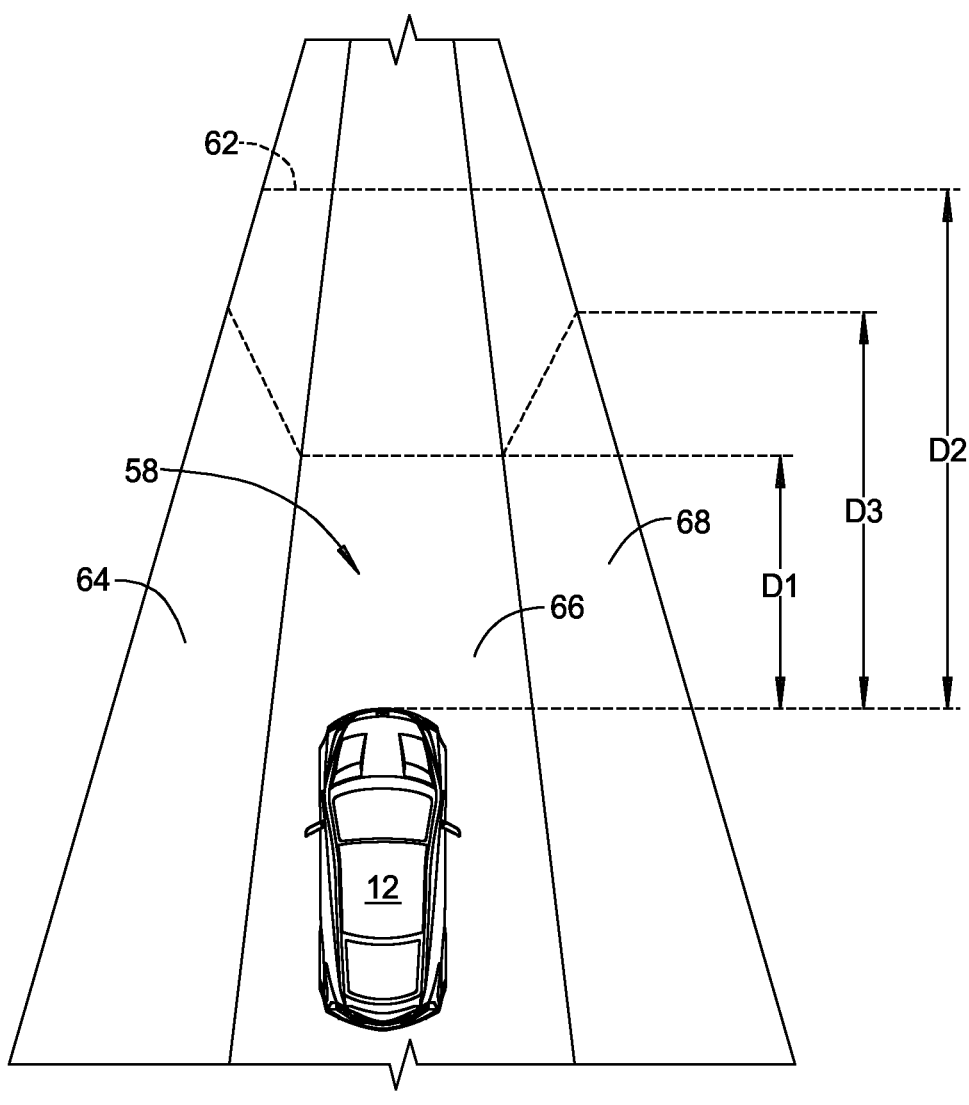
FIG. 4 is a schematic diagram of the second image plane of the dual-focal plane augmented reality display, according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 60 and a second image plane 62. The first image plane 60 shows the view of the outside world, and the second image plane 62 is reserved for displaying the AR-HUD graphics 42. The second image plane 62 spans multiple lanes and the AR-HUD graphics 42 appear at a location farther on a roadway surface 58 relative to the first image plane 60. For instance, as shown in FIGS. 3 and 4, the second image plane 62 covers a left lane 64, a central lane 66, and a right lane 68. As a non-limiting example, in the central lane 66, the second image plane 62 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 40 see the AR-HUD graphics 42 displayed using the AR-HUD projector 44. In the left lane 64 and the right lane 68, the second image plane 62 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 40 see the AR-HUD graphics 42 displayed using the AR-HUD projector 44. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 42 on the view of the outside word. For instance, by using a dual-focal plane AR-HUD, the size, location, and characteristics of the AR-HUD graphics 42 may be changed based on, for example, the location of the eyes 40*b* of the occupant 40.

Referring again to FIG. 1, the TWD system 20 is used to display images on the windscreen 38 of the vehicle 12. In an exemplary embodiment, the AR-HUD system 18 can display the AR-HUD graphics 42 in a predefined region of the windscreen 38 (e.g., in the first image plane 60 and the second image plane 62). The TWD system 20 can display TWD graphics (not shown) in any region of the windscreen 38. It should be understood that the terms AR-HUD graphics 42 and TWD graphics may be used interchangeably in the present disclosure, as AR-HUD graphics 42 may be displayed using the TWD system 20, and TWD graphics may be displayed using the AR-HUD system 18. The terms refer to any graphics displayed by the AR-HUD system 18 (AR-HUD graphics 42) or the TWD system 20 (TWD graphics). By operating the AR-HUD system 18 and the TWD system 20 in conjunction, the vehicle controller 14 may display graphics in any region of the windscreen 38. In an exemplary embodiment, the TWD system 20 includes transparent phosphors (not shown) embedded into the windscreen 38 and a TWD projector 70. The TWD system 20 is in electrical communication with the vehicle controller 14 as discussed above.

The transparent phosphors are light emitting particles which fluoresce in response to being excited by the TWD projector 70. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 70 is used to excite the transparent phosphors in a predetermined pattern to produce the TWD graphics on the windscreen 38. In an exemplary embodiment, the TWD projector 70 is a violet/ultraviolet laser projector disposed proximally to the headliner of the vehicle 12. The TWD projector 70 includes three lasers, each laser configured to excite one of the red, green, or blue transparent phosphors.

In an exemplary embodiment, the HMI 22 is used in addition to the AR-HUD system 18 and the TWD system 20 to display information to the occupant 40 of the vehicle 12. In another exemplary embodiment, the HMI 22 is used instead of the AR-HUD system 18 and/or the TWD system 20 to display information to the occupant 40 of the vehicle 12. In the aforementioned exemplary embodiments, the HMI 22 is a display system located in view of the occupant 40 and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the vehicle controller 14 as discussed above.

Figure 5:
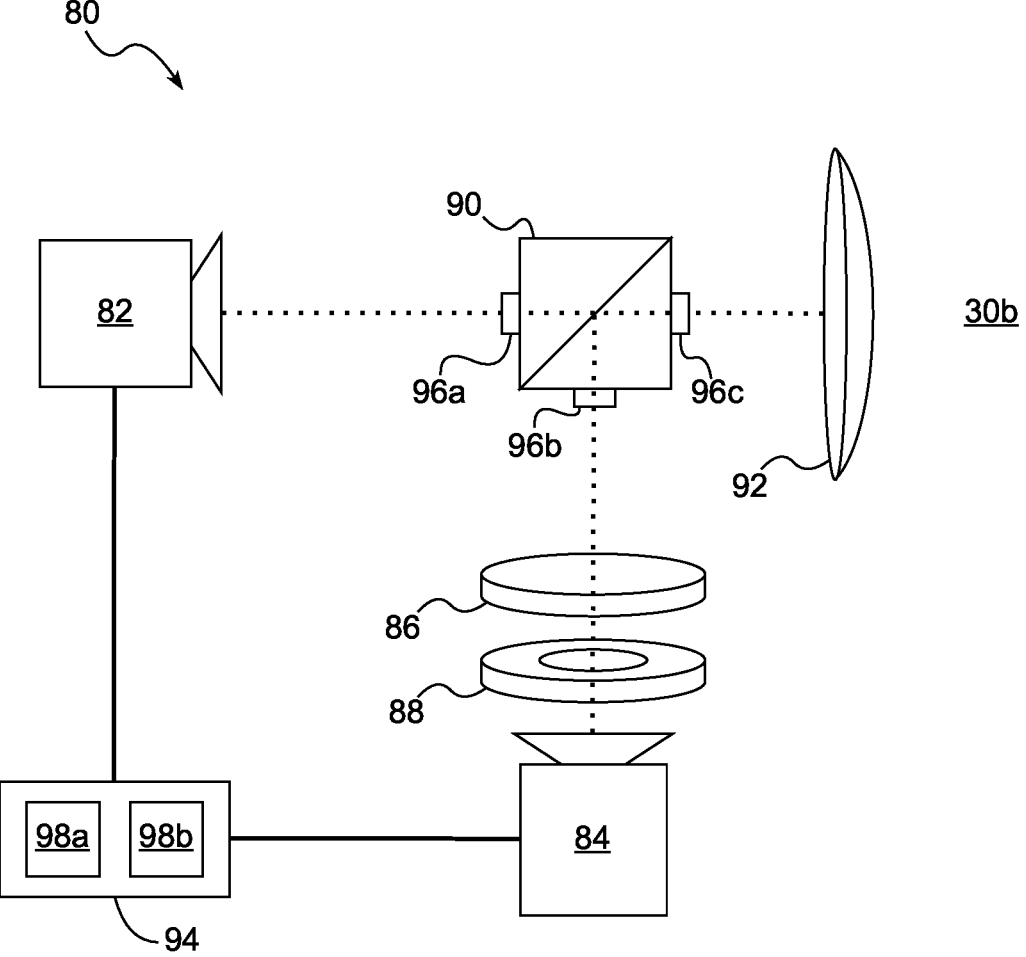
FIG. 5 is a schematic diagram of a machine learning training system, according to an exemplary embodiment.

Referring to FIG. 5, a schematic diagram of a machine learning training system 80 is shown. The system 80 is used to train a machine learning algorithm to receive nighttime images and output enhanced images, as will be discussed in greater detail below. The system 80 includes a first training camera 82, a second training camera 84, a first filter 86, a second filter 88, a beam splitter 90, a relay lens 92, and a training controller 94.

The first training camera 82 and the second training camera 84 are used to capture images of an environment 30*b* surrounding the system 80. In the scope of the present disclosure, the first training camera 82 and the second training camera 84 are referred to as "training" cameras because they are used in the machine learning training system 80 to capture training data, as will be discussed in further detail below. In an exemplary embodiment, the first training camera 82 and the second training camera 84 are similar in structure and function to the camera(s) of the camera system 32 discussed above. The first training camera 82 and the second training camera 84 are color (RGB) cameras. It should further be understood that cameras having various sensor types including, for example, charge-coupled device (CCD) sensors, complementary metal oxide semiconductor (CMOS) sensors, high dynamic range (HDR) sensors, sensors having a Bayer filter array, and/or sensors having an X-Trans filter array are within the scope of the present disclosure. Furthermore, cameras having various lens types including, for example, wide-angle lenses and/or narrow-angle lenses are also within the scope of the present disclosure.

The first filter 86 is used to reduce the amount of light entering the second training camera 84 to create a simulated nighttime image. In an exemplary embodiment, the first filter 86 is a neutral density filter. In the scope of the present disclosure, the neutral density filter is a filter which reduces an intensity of all incident wavelengths of light equally across the entire area of the neutral density filter. Neutral density filters may be characterized by optical density. Optical density is defined as:

$$d = -\log\left(\frac{I_T}{I_0}\right) \tag{1}$$

wherein d is the optical density, $I_T$ is an intensity of light transmitted through the neutral density filter, and $I_0$ is an intensity of light incident upon the neutral density filter. In the scope of the present disclosure, the first filter 86 has a constant optical density across the entire area of the first filter 86. Therefore, images of the environment 30*b* captured during daytime appear darkened. The first filter 86 is in optical communication with the beam splitter 90 and the second filter 88.

In the scope of the present disclosure, optical communication means that light can propagate through the space between the components and interact with the optical properties of each component. Optical communication may be facilitated by positioning components such that light is transmitted between the components due to the intrinsic reflection and/or refraction characteristics of the components and/or characteristics of a medium between the components (e.g., air). Optical communication may also be facilitated by the use of an optical waveguide (i.e., a physical structure that is designed to confine and guide light along a specified path). It should further be understood that various additional methods for establishing optical communication between optical components, including, for example, planar waveguides, rib waveguides, channel waveguides, hollow core waveguides, and the like are within the scope of the present disclosure.

The second filter 88 is used to simulate the effect of headlights of the vehicle 12, making the simulated nighttime image more applicable for the vehicle application. In an exemplary embodiment, the second filter 88 is a reverse apodizing neutral density filter. In the scope of the present disclosure, the reverse apodizing neutral density filter is a type of neutral density filter having a varying optical density across the area of the reverse apodizing neutral density filter. In a non-limiting example, the second filter 88 is a reverse apodizing neutral density filter having an optical density of approximately zero near a center of the second filter 88, and an increasing optical density approaching an outside edge of the second filter 88 (such as, for example, the model NDYR20B reverse apodizing filter sold by THORLABS, INC.). Therefore, the high-transmission region in the center of the second filter 88 simulates increased light provided by headlights of the vehicle 12 in a nighttime scenario. The second filter 88 is in optical communication with the first filter 86 and the second training camera 84.

The beam splitter 90 is used to direct light from the relay lens 92 to the first training camera 82 and the second training camera 84. In an exemplary embodiment, the beam splitter 90 is an optical device configured to split a beam of light into a transmitted beam and a reflected beam. In a non-limiting example, the beam splitter 90 has three ports which allow transmission of light into/out of the beam splitter 90. A first port 96*a* is in optical communication with the first training camera 82. A second port 96*b* is in optical communication with the first filter 86, the second filter 88, and the second training camera 84. A third port 96*c* is in optical communication with the relay lens 92. In a non-limiting example, the beam splitter 90 includes two triangular glass prisms which are adhered together at their base using a polyester, epoxy, and/or urethane-based adhesive layer. A thickness of the adhesive layer is adjusted such that approximately half of the light incident through the third port 96*c* of the beam splitter 90 is reflected and exits the second port 96*b* and approximately half of the light incident through the third port 96*c* is transmitted and exits the first port 96*a*.

The relay lens 92 is used to receive light from the environment 30*b* and transmit the light to the beam splitter 90. In an exemplary embodiment, the relay lens 92 may be any type of lens configured to focus and/or transmit light for camera systems.

The training controller 94 is in electrical communication with the first training camera 82 and the second training camera 84. The training controller 94 includes at least one training processor 98a and a training non-transitory computer readable storage device or training media 98b. The description of the type and configuration given above for the vehicle controller 14 also applies to the training controller 94. In a non-limiting example, the training processor 98a and training media 98b of the training controller 94 are similar in structure and/or function to the processor 26 and the media 28 of the vehicle controller 14, as described above. In an exemplary embodiment, the training controller 94 may further include an electrical interface (not shown) for communicating with external devices, such as, for example, the vehicle controller 14. In a non-limiting example, the electrical interface is a serial or parallel port which allows digital transmission of information. In a non-limiting example, the electrical interface is a wireless communication system allowing wireless transmission of digital information. In a non-limiting example, the information includes training data, training statistics, machine learning model parameters, and/or the like.

In some embodiments, the system 80 may be partially or fully integrated with the system 10. In other words, the system 80 may be affixed to the vehicle 12 and the training controller 94 may be in electrical communication with the vehicle controller 14. In other embodiments, the system 80 is used separately from the system 10, and training results (e.g., model parameters) are transferred from the training controller 94 to the vehicle controller 14 after training.

Figure 6:
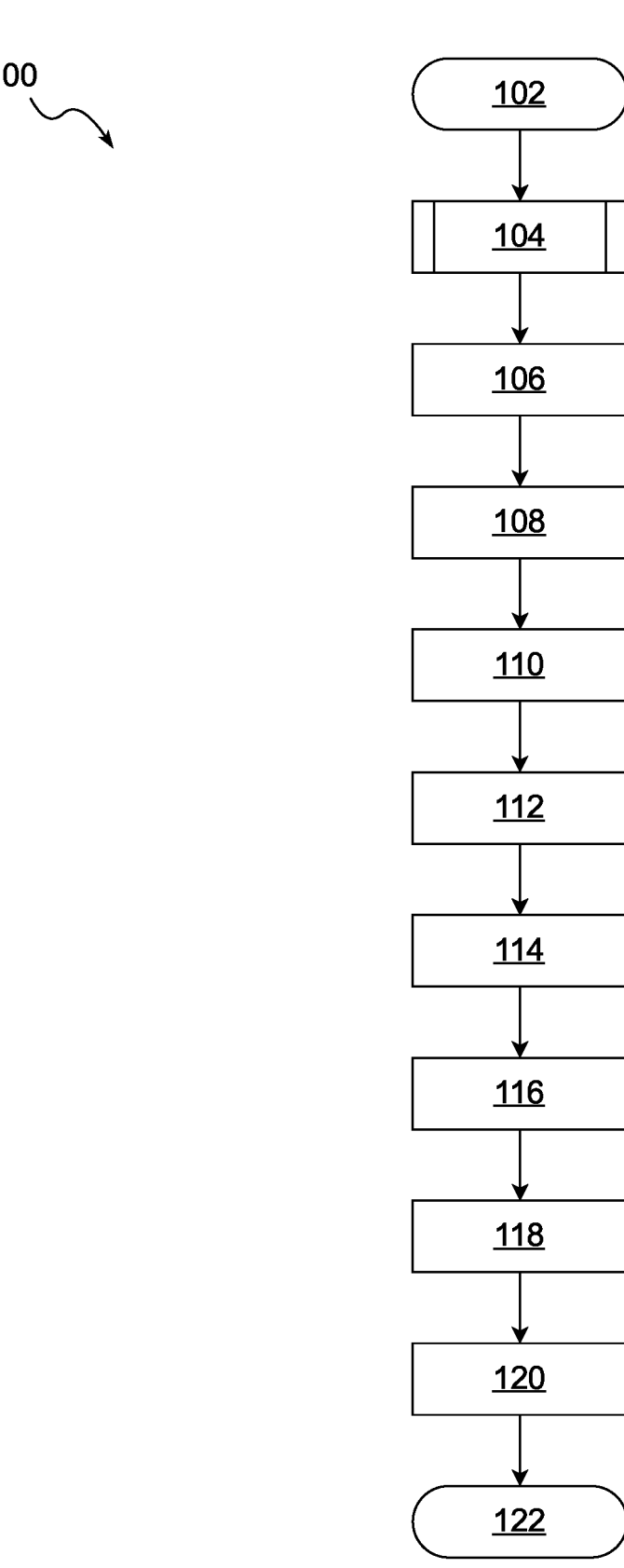
FIG. 6 is a flowchart of a method for providing information to an occupant of a vehicle, according to an exemplary embodiment.

Referring to FIG. 6, a flowchart of the method 100 for providing information to an occupant of a vehicle is provided. The method 100 begins at block 102 and proceeds to block 104. At block 104, the system 10 and/or the system 80 are used to generate a training dataset, as will be discussed in greater detail below. In an exemplary embodiment, the training dataset includes a plurality of image pairs. Each of the plurality of image pairs includes a sample input image and a sample output image. After block 104, the method 100 proceeds to block 106.

At block 106, the system 10 and/or the system 80 are used to train the machine learning algorithm to receive a nighttime image and output an enhanced image using the training dataset generated at block 104. In the scope of the present disclosure, the nighttime image is an image of the environment 30a captured by the camera system 32 during a nighttime driving scenario with reduced environmental light. Due to reduced light, the nighttime image may lack detail and contrast. The enhanced image is a restored (i.e., enhanced) version of the nighttime image having increased contrast, detail, and/or color accuracy.

In a non-limiting example, the machine learning algorithm includes multiple layers, including an input layer and an output layer, as well as one or more hidden layers. The input layer receives the nighttime image as an input. The input is then passed on to the hidden layers. Each hidden layer applies a transformation (e.g., a non-linear transformation) to the nighttime image and passes the result to the next hidden layer until the final hidden layer. The output layer produces the final enhanced image.

To train the machine learning algorithm, the training dataset of sample input images and their corresponding sample output images generated at block 104 is used. The machine learning algorithm is trained by adjusting internal weights between nodes in each hidden layer to minimize error. During training, an optimization technique (e.g., gradient descent) is used to adjust the internal weights to reduce the error. The training process is repeated with the entire dataset until the error is minimized, and the resulting trained model is then used to enhance new input images.

After sufficient training of the machine learning algorithm, the algorithm is capable of enhancing nighttime images. By adjusting the weights between the nodes in each hidden layer during training, the algorithm "learns" to recognize patterns in the nighttime images that are indicative of particular corresponding patterns, objects, structures, and/or the like in the enhanced images. After block 106, the method 100 proceeds to block 108.

At block 108, the vehicle controller 14 uses the camera system 32 to capture the nighttime image of the environment 30a surrounding the vehicle 12. After block 108, the method 100 proceeds to block 110.

At block 110, the vehicle controller 14 uses the machine learning model to enhance the nighttime image captured at block 108 to produce the enhanced image. As discussed above, in an exemplary embodiment, the input layer of the machine learning algorithm receives the nighttime image as an input. The input is then passed on to the hidden layers. Each hidden layer applies a transformation (e.g., a non-linear transformation) to the nighttime image and passes the result to the next hidden layer until the final hidden layer. The output layer produces the final enhanced image. After block 110, the method 100 proceeds to block 112.

At block 112, the vehicle controller 14 segments the enhanced image produced at block 110 into a plurality of image segments. Each of the plurality of image segments represents one of a plurality of objects in the enhanced image. In an exemplary embodiment, the vehicle controller 14 uses a computer vision segmentation algorithm to segment the enhanced image. In a non-limiting example, the segmentation algorithm uses methods such as, for example, edge detection, thresholding, clustering, and/or machine learning techniques such as convolutional neural networks. It should be understood that any method for segmenting objects in images is within the scope of the present disclosure. After block 112, the method 100 proceeds to block 114.

At block 114, the vehicle controller 14 identifies an object of interest in the enhanced image. In the scope of the present disclosure, the object of interest is an object which is relevant to a driving task. In a non-limiting example, objects of interest may include, for example, pedestrians near a roadway, animals near the roadway, remote vehicles on or near the roadway, objects near the roadway, traffic signs/signals, lane markings, and/or the like. In an exemplary embodiment, the object of interest is one of the plurality of objects identified in the enhanced image at block 112. After block 114, the method 100 proceeds to block 116.

At block 116, the vehicle controller 14 determines a location of the object of interest identified at block 114 relative to the vehicle 12. In an exemplary embodiment, the vehicle controller 14 uses the vehicle sensors 16 to detect the object of interest and determine the location of the object of interest relative to the vehicle 12. After block 116, the method 100 proceeds to block 118.

At block 118, the vehicle controller 14 calculates the size, shape, and location of the AR-HUD graphic 42 as discussed above. The location of the AR-HUD graphic 42 is chosen such that the AR-HUD graphic 42 appears overlayed on the object of interest in the environment 30a surrounding the vehicle 12 from the perspective of the occupant 40. After block 118, the method 100 proceeds to block 120.

At block 120, the vehicle controller 14 determines the position of the occupant 40 using the occupant position tracking device 46, as discussed above, and displays the AR-HUD graphic 42 on the windscreen 38 of the vehicle 12 using at least one of the AR-HUD system 18 and the TWD system 20, as discussed above. In an exemplary embodiment, the vehicle controller 14 additionally uses the HMI 22 to provide an augmented view of the environment 30a surrounding the vehicle 12 including the AR-HUD graphic 42. After block 120, the method 100 proceeds to enter a standby state at block 122.

In an exemplary embodiment, the vehicle controller 14 repeatedly exits the standby state 122 and restarts the method 100 at block 102. In a non-limiting example, the vehicle controller 14 exits the standby state 122 and restarts the method 100 on a timer, for example, every three hundred milliseconds.

Figure 7:
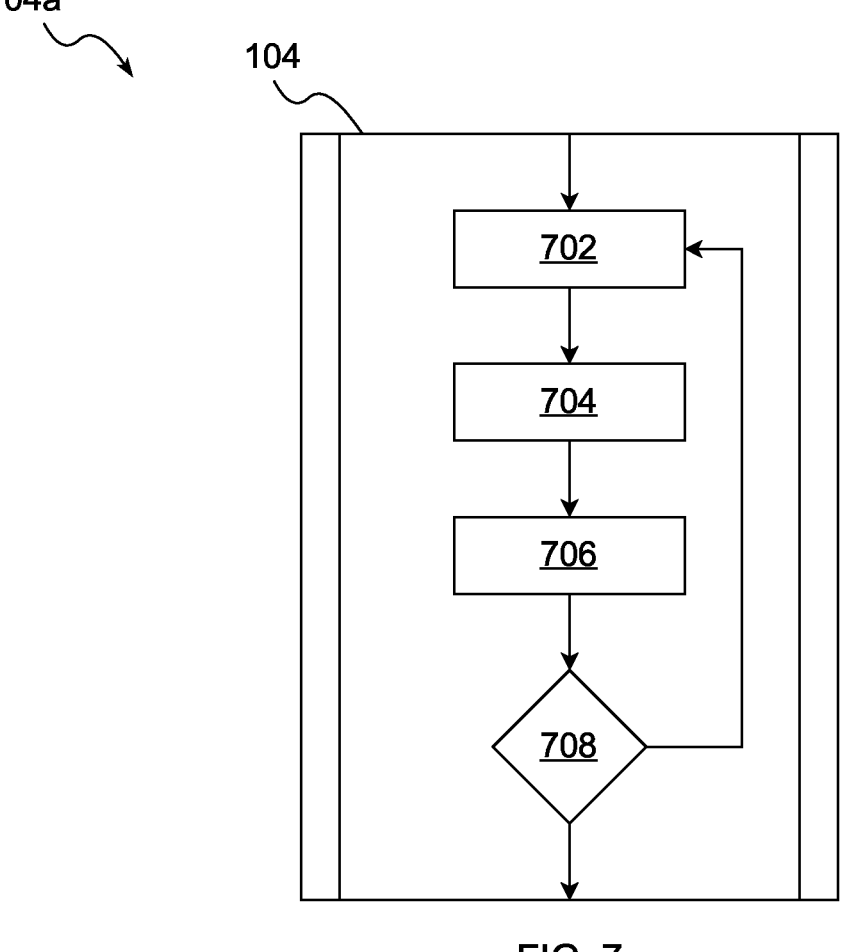
FIG. 7 is a flowchart of a first method for generating a training dataset, according to an exemplary embodiment.

Referring to FIG. 7, a flowchart of a first exemplary embodiment 104a of block 104 is shown. The first exemplary embodiment 104a is a method for generating the training dataset using the system 10. The first exemplary embodiment 104a begins at block 702. At block 702, the vehicle controller 14 uses the camera system 32 to capture a normal exposure image of a nighttime environment surrounding the vehicle 12. In the scope of the present disclosure, a normal exposure image is an image which is exposed for a default exposure time suitable for daytime image capture (e.g., a shutter speed of $1/30^{th}$ of a second). A nighttime environment is an environment 30a which is poorly lit due to lack of sunlight, for example, after sunset. Nighttime environments may also occur during inclement weather, under overpasses/bridges, in tunnels, and/or the like. After block 702, the first exemplary embodiment 104a proceeds to block 704.

At block 704, the vehicle controller 14 uses the camera system 32 to capture a high exposure image of the nighttime environment surrounding the vehicle. In the scope of the present disclosure, a high exposure image is an image which is exposed for a long exposure time suitable for very low light image capture (e.g., a shutter speed of 30 seconds). It should be understood that the images captured at blocks 702 and 704 are captured of a same subject, and that the camera system 32 is not moved between execution of blocks 702 and 704. After block 704, the first exemplary embodiment 104a proceeds to block 706.

At block 706, the images captured at blocks 702 and 704 are saved in the media 28 of the vehicle controller 14 as an image pair. In a non-limiting example, the image captured at block 702 is referred to as the sample input image, and the image captured at block 704 is referred to as the sample output image. After block 706, the first exemplary embodiment 104a proceeds to block 708.

At block 708, if a quantity of image pairs in the media 28 of the vehicle controller 14 is less than a predetermined training dataset threshold (e.g., one thousand image pairs), the first exemplary embodiment 104a returns to block 702 to capture more image pairs. If the quantity of image pairs in the media 28 of the vehicle controller 14 is greater than or equal to the predetermined training dataset threshold (e.g., one thousand image pairs), the first exemplary embodiment 104a is concluded, and the method 100 proceeds as discussed above.

Figure 8:
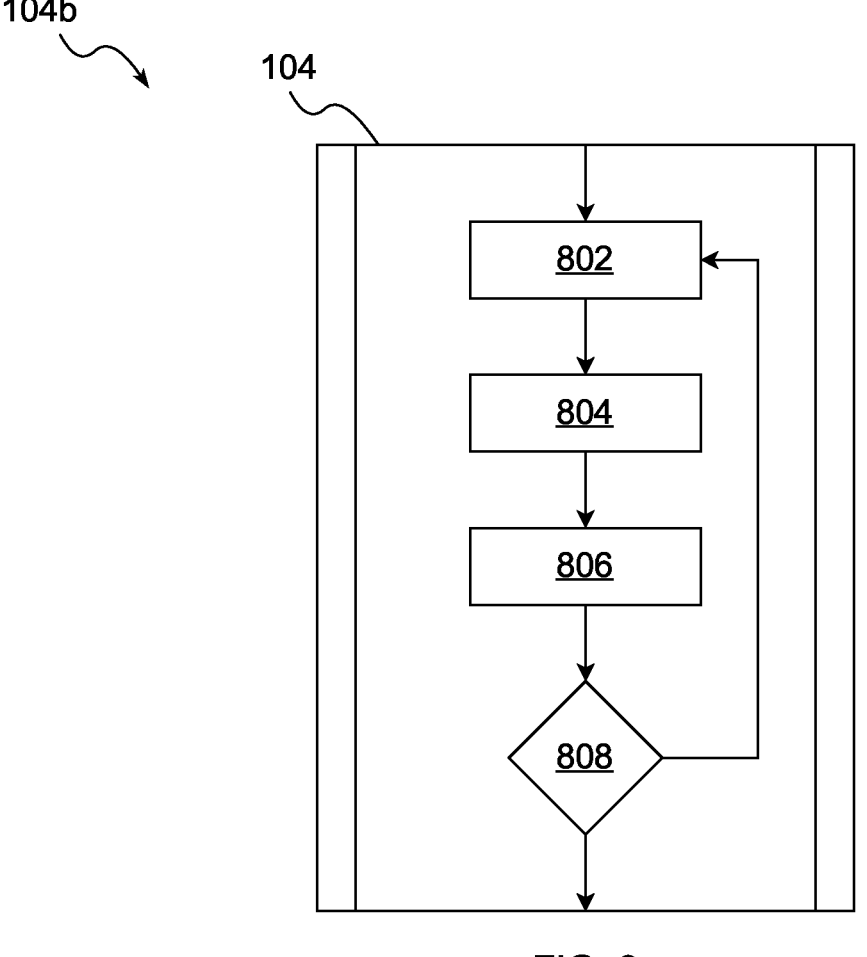
FIG. 8 is a flowchart of a second method for generating a training dataset, according to an exemplary embodiment.

Referring to FIG. 8, a flowchart of a second exemplary embodiment 104b of block 104 is shown. The second exemplary embodiment 104b is a method for generating the training dataset using the system 10. The second exemplary embodiment 104b begins at block 802. At block 802, the vehicle controller 14 uses the camera system 32 to capture a normal exposure image of a nighttime environment surrounding the vehicle 12. In the scope of the present disclosure, a normal exposure image is an image which is exposed for a default exposure time suitable for daytime image capture (e.g., a shutter speed of $1/30^{th}$ of a second). A nighttime environment is an environment 30a which is poorly lit due to lack of sunlight. Nighttime environments may also occur during inclement weather, under overpasses/bridges, in tunnels, and/or the like. After block 802, the second exemplary embodiment 104b proceeds to block 804.

At block 804, the vehicle controller 14 restores the image captured at block 802 to create a computer restored image of the nighttime environment. In an exemplary embodiment, to restore the image, the vehicle controller 14 uses a computer vision denoising algorithm configured to reduce noise and enhance visual quality of noisy images. In a non-limiting example, the computer vision denoising algorithm is a non-local means (NLM) algorithm. The NLM algorithm compares each pixel with neighboring pixels to identify similarities across the image, preserving edges and fine details while reducing noise. In another non-limiting example, the computer vision denoising algorithm is a deep learning based denoising algorithm, using, for example, a convolutional neural network (CNN) which has been trained on a plurality of noisy-clean image pairs. It should be understood that any computer vision denoising algorithm may be used without departing from the scope of the present disclosure.

In another exemplary embodiment, to restore the image, the vehicle controller 14 uses a computer vision dehazing algorithm configured to restore visibility and enhance the visual quality of hazy images. In a non-limiting example, the computer vision dehazing algorithm is a dark channel prior (DCP) algorithm. The DCP algorithm relies on the observation that at least some pixels in an image have very low intensity values in at least one color channel, referred to as a dark channel. The dark channel is indicative of the presence of haze and is used to identify and remove haze, restoring visibility. In another non-limiting example, the computer vision dehazing algorithm is a deep learning based dehazing algorithm, using, for example, a convolutional neural network (CNN) which has been trained on a plurality of hazy-clean image pairs. It should be understood that any computer vision dehazing algorithm may be used without departing from the scope of the present disclosure. After block 804, the second exemplary embodiment 104b proceeds to block 806.

At block 806, the images captured at block 802 and generated at block 804 are saved in the media 28 of the vehicle controller 14 as an image pair. In a non-limiting example, the image captured at block 802 is referred to as the sample input image, and the image generated at block 804 is referred to as the sample output image. After block 806, the second exemplary embodiment 104b proceeds to block 808.

At block 808, if a quantity of image pairs in the media 28 of the vehicle controller 14 is less than a predetermined training dataset threshold (e.g., one thousand image pairs), the second exemplary embodiment 104b returns to block 802 to capture more image pairs. If the quantity of image pairs in the media 28 of the vehicle controller 14 is greater than or equal to the predetermined training dataset threshold (e.g., one thousand image pairs), the second exemplary embodiment 104b is concluded, and the method 100 proceeds as discussed above.

Figure 9:
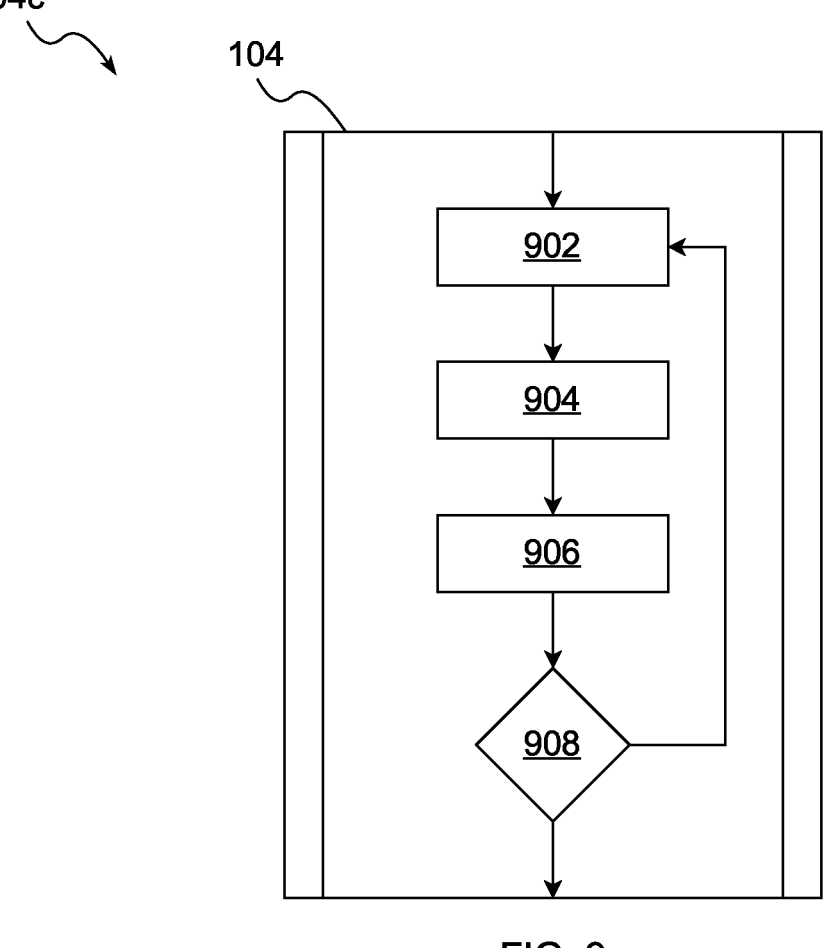
FIG. 9 is a flowchart of a third method for generating a training dataset, according to an exemplary embodiment.

Referring to FIG. 9, a flowchart of a third exemplary embodiment 104c of block 104 is shown. Referring to FIG. 9, and with reference to FIG. 5, the third exemplary embodiment 104c is a method for generating the training dataset using the machine learning training system 80. The third exemplary embodiment 104c begins at block 902. At block 902, the training controller 94 uses the first training camera 82 to capture a normal exposure image of a daytime environment surrounding the system 80. In the scope of the present disclosure, a normal exposure image is an image which is exposed for a default exposure time suitable for daytime image capture (e.g., a shutter speed of $1/30^{th}$ of a second). A daytime environment is an environment 30b which is adequately lit, for example, with sunlight and/or streetlighting. After block 902, the third exemplary embodiment 104c proceeds to block 904.

At block 904, the training controller 94 uses the second training camera 84 to capture a simulated nighttime image of the daytime environment surrounding the vehicle. In the scope of the present disclosure, the simulated nighttime image refers to the fact that the image captured by the second training camera 84 is darkened by the first filter 86 and the second filter 88, as discussed above in reference to FIG. 5. It should be understood that the images captured at blocks 902 and 904 are captured of a same subject. The blocks 902 and 904 may be executed sequentially or simultaneously. By securing the system 80 to a moving vehicle and executing the blocks 902 and 904 simultaneously, large amounts of training data may be gathered quickly. After block 904, the third exemplary embodiment 104c proceeds to block 906.

At block 906, the images captured at blocks 902 and 904 are saved in the training media 98b of the training controller 94 as an image pair. In a non-limiting example, the image captured at block 902 is referred to as the sample output image, and the image captured at block 904 is referred to as the sample input image. After block 906, the third exemplary embodiment 104c proceeds to block 908.

At block 908, if a quantity of image pairs in the training media 98b of the training controller 94 is less than a predetermined training dataset threshold (e.g., one thousand image pairs), the third exemplary embodiment 104c returns to block 902 to capture more image pairs. If the quantity of image pairs in the training media 98b of the training controller 94 is greater than or equal to the predetermined training dataset threshold (e.g., one thousand image pairs), the third exemplary embodiment 104c is concluded, and the method 100 proceeds as discussed above.

Figure 10:
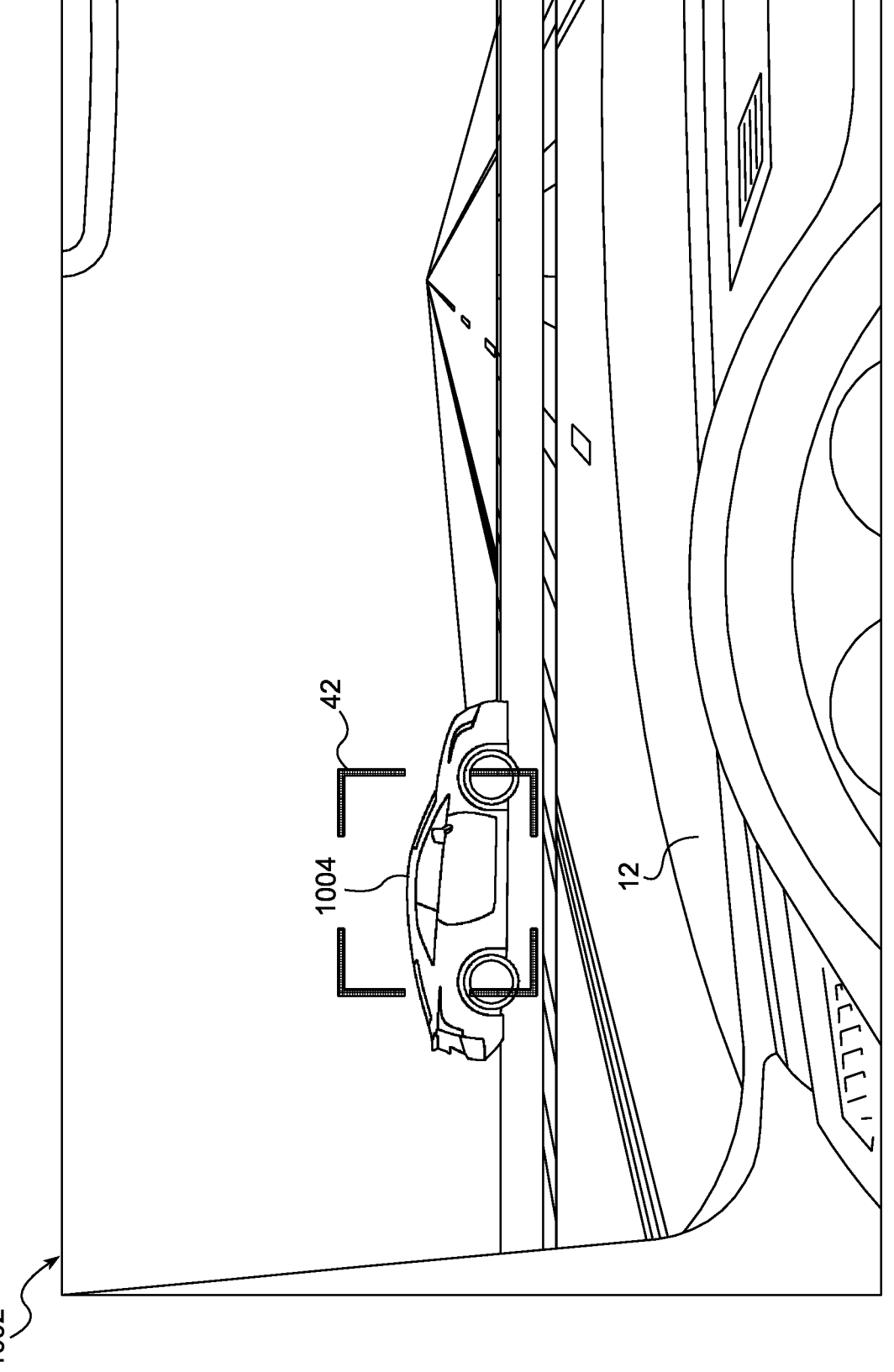
FIG. 10 is a diagram of a driving scene, according to an exemplary embodiment.

Referring to FIG. 10, an exemplary driving scene 1002 showing use of the system 10 and method 100 is shown. The exemplary driving scene 1002 includes the vehicle 12 from a perspective of the occupant 40, a remote vehicle 1004 and the AR-HUD graphic 42. In the exemplary driving scene 1002, the remote vehicle 1004 is the object of interest. Thus, the AR-HUD graphic 42 indicates the presence and location of the remote vehicle 1004 to the occupant 40, increasing occupant awareness.

The systems 10, 80, and method 100 of the present disclosure offer several advantages. With the system 10 and method 100, occupant awareness may be increased during nighttime driving by providing notification to the occupant 40 of objects of interest in the environment 30a surrounding the vehicle 12. With the system 80, machine learning training data for the system 10 and method 100 may be efficiently collected during daytime conditions, allowing for a high volume of high-quality training data to be collected, increasing machine learning model accuracy and performance.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for providing information to an occupant of a vehicle, the method comprising:
   generating a training dataset, wherein the training dataset includes a plurality of image pairs, wherein each of the plurality of image pairs includes a sample input image and a sample output image, and wherein generating the training dataset further comprises:
      capturing the plurality of image pairs using a camera of the vehicle, wherein, for each of the plurality of image pairs, the sample input image is a normal exposure image of a nighttime environment surrounding the vehicle and the sample output image is a computer restored image of the nighttime environment surrounding the vehicle, wherein capturing one of the plurality of image pairs further comprises:
         capturing the sample input image using the camera; and
         generating the sample output image by restoring the sample input image using at least one of: a computer vision denoising algorithm and a computer vision dehazing algorithm;
   training a machine learning algorithm to receive a nighttime image as an input and produce an enhanced image as an output using supervised learning with the training dataset;
   capturing the nighttime image of an environment surrounding the vehicle using the camera of the vehicle;
   enhancing the nighttime image using the machine learning algorithm to produce the enhanced image;
   identifying an object of interest in the enhanced image using a computer vision algorithm; and
   notifying the occupant of the vehicle about the object of interest.

2. The method of claim 1, wherein generating the training dataset further comprises:
   capturing the plurality of image pairs using the camera, wherein, for each of the plurality of image pairs, the sample input image is a normal exposure image of a nighttime environment surrounding the vehicle and the sample output image is a high exposure image of the nighttime environment surrounding the vehicle.

3. The method of claim 1, wherein generating the training dataset further comprises:
   capturing the plurality of image pairs using the camera, wherein, for each of the plurality of image pairs, the sample input image is a simulated nighttime image of a daytime environment surrounding the vehicle and the sample output image is a normal exposure image of the daytime environment surrounding the vehicle.

4. The method of claim 3, wherein capturing one of the plurality of image pairs further comprises:
   capturing the sample output image using a first training camera; and
   capturing the sample input image using a second training camera and a reverse apodizing neutral density filter configured to darken the sample output image.

5. The method of claim 1, wherein identifying the object of interest further comprises:
   segmenting the enhanced image into a plurality of image segments, wherein each of the plurality of image segments represents one of a plurality of objects in the enhanced image; and
   identifying the object of interest, wherein the object of interest is one of the plurality of objects in the enhanced image.

6. The method of claim 1, wherein notifying the occupant of the vehicle further comprises:

displaying a notification to the occupant of the vehicle using a display.

7. The method of claim 6, wherein the display is at least one of an augmented reality head-up display (AR-HUD) system and a transparent windscreen display (TWD) system, and wherein displaying the notification further comprises:

determining a location of the object of interest relative to the vehicle;

calculating a size, shape, and location of a graphic based on the location of the object of interest relative to the vehicle; and displaying the graphic on a windscreen of the vehicle using at least one of the AR-HUD system and the TWD system based on the size, shape, and location.

8. A system for providing information to an occupant of a vehicle, the system comprising:

a notification system including:

a camera;

a display;

a vehicle controller in electrical communication with the camera and the display, wherein the vehicle controller includes a non-volatile memory storing instructions which cause the vehicle controller to:

capture a nighttime image of an environment surrounding the vehicle using the camera;

enhance the nighttime image using a machine learning algorithm to produce an enhanced image;

identify an object of interest in the enhanced image using a computer vision algorithm; and notify the occupant of the vehicle about the object of interest using the display; and a training system including:

a training camera system including:

a beam splitter having a first port, a second port, and a third port;

a first training camera in optical communication with the first port of the beam splitter;

a second training camera;

a reverse apodizing neutral density filter in optical communication with the second training camera and the second port of the beam splitter;

a relay lens in optical communication with the third port of the beam splitter; and a training controller in electrical communication with the first training camera and the second training camera, wherein the training controller includes a non-volatile memory storing instructions which program the training controller to:

generate a training dataset using the training camera system, wherein the training dataset includes a plurality of image pairs, and wherein each of the plurality of image pairs includes a sample input image and a sample output image; and train the machine learning algorithm using supervised learning with the training dataset.

9. The system of claim 8, wherein to identify the object of interest, the vehicle controller is further programmed to:

segment the enhanced image into a plurality of image segments, wherein each of the plurality of image segments represents one of a plurality of objects in the enhanced image; and identify the object of interest, wherein the object of interest is one of the plurality of objects in the enhanced image.

10. The system of claim 8, wherein the display is an augmented reality head-up display (AR-HUD) system in electrical communication with the vehicle controller, wherein the AR-HUD system includes an occupant position tracking device and an AR-HUD projector, and wherein to notify the occupant of the vehicle, the vehicle controller is further programmed to:

determine a location of the object of interest relative to the vehicle;

determine a position of the occupant of the vehicle using the occupant position tracking device;

calculate a size, shape, and location of a graphic based on the position of the occupant and the location of the object of interest relative to the vehicle; and display the graphic on a windscreen of the vehicle using the augmented reality head up display system based on the size, shape, and location.

11. The system of claim 10, wherein the display further includes a transparent windscreen display (TWD) system in electrical communication with the vehicle controller, wherein the TWD system includes a TWD projector, and wherein to notify the occupant of the vehicle, the vehicle controller is further programmed to:

display the graphic on the windscreen of the vehicle using the TWD projector based on the size, shape, and location.

12. The system of claim 8, wherein to generate the training dataset, the training controller is further programmed to:

capture the plurality of image pairs using the first training camera and the second training camera, wherein, for each of the plurality of image pairs, the sample input image is a simulated nighttime image of a daytime environment surrounding the vehicle and the sample output image is a normal exposure image of the daytime environment surrounding the vehicle.

13. The system of claim 12, wherein to capture one of the plurality of image pairs, the training controller is further programmed to:

capture the sample output image using the first training camera; and capture the sample input image using the second training camera.

14. A system for providing information to an occupant of a vehicle, the system comprising:

a notification system including:

a camera;

an augmented reality head-up display (AR-HUD) system including an occupant position tracking device and an AR-HUD projector;

a vehicle controller in electrical communication with the camera and the AR-HUD system, wherein the vehicle controller includes a non-volatile memory storing instructions which cause the vehicle controller to:

capture a nighttime image of an environment surrounding the vehicle using the camera;

enhance the nighttime image using a machine learning algorithm to produce an enhanced image;

identify an object of interest in the enhanced image using a computer vision algorithm;

determine a location of the object of interest relative to the vehicle;

determine a position of the occupant of the vehicle using the occupant position tracking device;

calculate a size, shape, and location of a graphic based on the position of the occupant and the location of the object of interest relative to the vehicle; and notify the occupant of the vehicle about the object of interest by displaying the graphic on a windscreen of the vehicle using the AR-HUD system based on the size, shape, and location.

15. The system of claim 14, further comprising:

a training system including:

a training camera system including:

a beam splitter having a first port, a second port, and a third port;

a first training camera in optical communication with the first port of the beam splitter;

a second training camera;

a reverse apodizing neutral density filter in optical communication with the second training camera and the second port of the beam splitter;

a relay lens in optical communication with the third port of the beam splitter; and a training controller in electrical communication with the first training camera and the second training camera, wherein the training controller is programmed to:

generate a training dataset using the training camera system, wherein the training dataset includes a plurality of image pairs, and wherein each of the plurality of image pairs includes a sample input image and a sample output image; and train the machine learning algorithm using supervised learning with the training dataset.

\* \* \* \* \*